(12) United States Patent
Haller et al.

(10) Patent No.: US 10,363,844 B2
(45) Date of Patent: Jul. 30, 2019

(54) ADJUSTABLE DAMPING SYSTEM FOR A VEHICLE SEAT

(71) Applicant: GRAMMER AG, Amberg (DE)

(72) Inventors: Erwin Haller, Birgland (DE); Jens Kolb, Konigstein (DE); Konstantin Krivenkov, Amberg (DE)

(73) Assignee: GRAMMER AG, Amberg (DE)

( * ) Notice: Subject to any disclaimer, the term of this patent is extended or adjusted under 35 U.S.C. 154(b) by 40 days.

(21) Appl. No.: 15/494,713

(22) Filed: Apr. 24, 2017

(65) Prior Publication Data
US 2017/0305312 A1    Oct. 26, 2017

(30) Foreign Application Priority Data

Apr. 25, 2016  (DE) .................. 10 2016 107 625

(51) Int. Cl.
*B60N 2/50*   (2006.01)
*B60N 2/52*   (2006.01)

(52) U.S. Cl.
CPC ............ *B60N 2/505* (2013.01); *B60N 2/501* (2013.01); *B60N 2/502* (2013.01); *B60N 2/508* (2013.01); *B60N 2/522* (2013.01)

(58) Field of Classification Search
CPC ........ B60N 2/505; B60N 2/501; B60N 2/502; B60N 2/508; B60N 2/522
USPC ...................................... 296/65.02
See application file for complete search history.

(56) References Cited

U.S. PATENT DOCUMENTS

| 5,358,305 A * | 10/1994 | Kaneko | B60N 2/0224 |
| | | | 296/65.02 |
| 5,390,121 A | 2/1995 | Wolfe | |
| 5,908,456 A | 6/1999 | Wahlers | |

(Continued)

FOREIGN PATENT DOCUMENTS

| CN | 204367943 | 6/2015 |
| CN | 105473888 | 4/2016 |

(Continued)

OTHER PUBLICATIONS

Search Report prepared by the German Patent Office dated Mar. 3, 2017, for German Patent Application No. 102016107625.2.

(Continued)

*Primary Examiner* — Joseph D. Pape
(74) *Attorney, Agent, or Firm* — Sheridan Ross P.C.

(57) ABSTRACT

The invention relates to an adjustable damping system for a vehicle seat for damping vibrations of a seat-part-side upper part relative to a body-side lower part in at least one spatial direction (X, Y, Z), at least one damping element, arranged between the seat-part-side upper part and the body-side lower part and adjustable by an adjustment device, being provided for the damping. The damping system is further distinguished in that at least one relative movement variable and a change in the relative movement variable of the seat-part-side upper part relative to the body-side lower part can be determined by a sensor device, and a first damping force of the damping element can be adjusted by the adjustment device as a function of the at least one relative movement variable and the frequency of the change in the relative movement variable.

13 Claims, 7 Drawing Sheets

(56) References Cited

U.S. PATENT DOCUMENTS

| | | | | |
|---|---|---|---|---|
| 5,975,508 A | * | 11/1999 | Beard | B60N 2/501 |
| | | | | 296/190.07 |
| 6,371,456 B1 | | 4/2002 | Ritchie et al. | |
| 2006/0226289 A1 | | 10/2006 | Robbins et al. | |
| 2012/0259248 A1 | | 10/2012 | Receveur | |

FOREIGN PATENT DOCUMENTS

| | | |
|---|---|---|
| DE | 195 43 928 C2 | 5/1997 |
| DE | 100 20 521 A1 | 10/2001 |
| DE | 102004054325 | 4/2006 |
| DE | 600 26 661 T2 | 12/2006 |
| DE | 60 2005 004 224 T2 | 12/2008 |
| DE | 11 2007 002 284 T5 | 8/2009 |
| DE | 10 2013 224 425 A1 | 6/2015 |
| WO | WO 01/81888 | 11/2001 |

OTHER PUBLICATIONS

Extended Search Report for European Patent Application No. 17164169.9, dated Oct. 2, 2017, 3 pages.
Official Action with English translation for China Patent Application No. 201710264950.9, dated Jan. 28, 2019, 9 pages.

* cited by examiner

ADJUSTABLE DAMPING SYSTEM FOR A VEHICLE SEAT

CROSS-REFERENCE TO RELATED APPLICATIONS

This application claims the benefit of German Patent Application No. DE 10 2016 107 625.2 filed Apr. 25, 2016, the entire contents of which are incorporated herein by reference.

FIELD

The invention relates to an adjustable damping system for a vehicle seat for damping vibrations of a seat-part-side upper part relative to a body-side lower part in at least one spatial direction (X, Y, Z), at least one damping element, arranged between the seat-part-side upper part and the body-side lower part and adjustable by an adjustment device, being provided for the damping.

BACKGROUND

In particular in off-road vehicles, such as construction vehicles and tractors, the vehicle seat has a major effect on the comfort of travel. Excessive vibrations, impacts and movements which are transmitted from the road surface via the vehicle seat to the person located on the seat can lead to fatigue and in the longer term also to health problems, such as back pain or bone erosion, in the person. Usually, damping/suspension systems are used to reduce these effects. Various basic suspension variants are known for this purpose, which differ in complexity and energy requirements: passive, semi-active and active suspension systems. In passive vehicle seats, the properties of the system components are constructionally predetermined, and cannot be varied during operation. In semi-active suspension systems, the dissipating properties of the seat suspension can be influenced selectively depending on the situation at hand. The hardness of the damper can be adjusted and/or the rigidity of the spring can be adapted. In active systems, energy can additionally be introduced into the system by way of suitable actuators.

For constant amplitudes of the excitation, conventional seat suspensions have a relatively large increase in the vibration amplitudes of the seat surface in the range around the resonant frequency. This leads to amplification of the excitation and to a significant reduction in both the objective and the subjective comfort of travel. Considering the seat as a vibrating system, it can be assigned a natural frequency. If this system is excited by harmonic vibrations of the vehicle floor, it vibrates at the same frequency as the vehicle, but at a different amplitude. At excitation frequencies of 0 to $\sqrt{2}$ times the natural frequency of the vibration system, the vibrations transmitted to the seat are amplified, the amplification being at a maximum at the resonant frequency. A reduction in the introduced vibrations sets in above $\sqrt{2}$ times the natural frequency, and becomes greater as the excitation frequency increases. However, this effect is influenced by the damping of the system. The greater the damping, the less the reducing effect. By contrast, low damping of the seat leads to reduced seat comfort below $\sqrt{2}$ times the natural frequency.

To reduce the vibration amplitudes in the range of the resonant frequency, adjustable-force dampers and special control algorithms are generally made use of. The damping characteristic may be adjusted adaptively or semi-actively.

In adaptive adjustment, the amplitudes of the relative speeds are compared with one or more thresholds. If the amplitude of the relative speed is below the defined threshold, the damper is operated at a maximum force so as to suppress the increase in the vibration amplitudes in the resonant range. Above this threshold, the damper is virtually completely switched off so as to increase the travel comfort in the range above the resonant range. However, this type of adjustment exhibits considerable deficits in travel comfort if seat suspension is excited in the ranges above and below the resonant frequency simultaneously.

In semi-active adjustment, for example using the widespread Skyhook algorithm, the described drawback is overcome by using an additional movement variable, in this case the acceleration of the seat surface. The characteristic of the damper is adapted to the travel situation at hand as a function of the absolute and relative movement variables. Eliminating the increase in the vibration amplitudes in the range of the resonant frequency thus comes at the cost of installing an additional sensor for monitoring the absolute movement of the seat surface.

SUMMARY

The object of the present invention is to provide a damping system which overcomes the aforementioned drawbacks. Further, the object is to provide a driver's seat having a damping system of this type. A further object of the invention is to provide a method for adjusting an adjustable damping system which overcomes the aforementioned drawbacks.

This object is achieved by an adjustable damping system for a vehicle seat for damping vibrations of a seat-part-side upper part relative to a body-side lower part in at least one spatial direction (X, Y, Z), at least one damping element, arranged between the seat-part-side upper part and the body-side lower part and adjustable by an adjustment device, being provided for the damping. The damping system is further distinguished in that at least one relative movement variable and a change in the relative movement variable of the seat-part-side upper part relative to the body-side lower part can be determined by a sensor device, and a first damping force of the damping element can be adjusted by the adjustment device as a function of the at least one relative movement variable and the frequency of the change in the relative movement variable.

This damping element can be based on any desired damping technology. Electrorheological or magnetorheological dampers or else hydraulic dampers having an electrically or mechanically controlled flow rate or else hydraulic dampers in combination with a hydraulic fluid pump would be conceivable. Thus, the damping may preferably be semi-active or active. The damper force is often also referred to as the damping intensity.

By contrast with the described prior art, only relative movement variables are used for adjusting the first damping force. This means that the absolute movement of the seat surface does not have to be determined so as to achieve effective suppression of the increase in vibration amplitude in the vicinity of the resonant frequency.

According to the invention, the adjustable damping system is configured to damp a movement of a seat-part-side upper part relative to a body-side lower part in at least one spatial direction (X, Y, Z). Thus, there may be damping of vibrations in the vertical direction (Z), but also damping of horizontal vibrations (X, Y). Thus, by way of the adjustable damping system, it is possible to provide an exclusively vertically operating damping system, a horizontal damping system, or a damping system which operates in all three spatial directions (X, Y, Z).

In the following, the terms "vertical position", "minimum settable height position", "maximum settable height position" and "height setting device" are used. In this context, these terms are not to be understood only in reference to a vertical deflection (Z), but also apply analogously in any other spatial direction (X, Y). A corresponding vertical position thus refers to the relevant damping travel of the damping element.

Preferably, the first damping force of the damping element is adjustable by way of the adjustment device as a function of a speed, an acceleration and the jerk of the seat-part-side upper part relative to the body-side lower part. Jerk is defined as the derivative of acceleration with respect to time, in other words the second derivative of speed with respect to time and the third derivative of the positional vector with respect to time. Thus, the sensor device preferably comprises a position sensor and a speed sensor. Preferably, the speed can be calculated from temporally discrete position sampling.

In a particularly preferred embodiment, the first damping force, adjustable by the adjustment device, of the damping element is proportional to the sum of a speed summand, an acceleration summand and a jerk summand. Preferably, the speed summand is the product of a first frequency-dependent amplification factor and the speed value. Also preferably, the acceleration summand is the product of a second frequency-dependent amplification factor and the acceleration value. Also preferably, the jerk summand is the product of a third frequency-dependent amplification factor and the jerk value. Jerk is defined as the derivative of acceleration with respect to time, in other words the second derivative of speed with respect to time and the third derivative of the positional vector with respect to time. Preferably, to reduce the increase in the vibration amplitudes of the seat-part-side upper part in the range of the resonant frequencies, the damping force for each time step is obtained by continuous manipulation of the sum of the current values of the following movement variables: relative speed, relative acceleration and relative jerk. Each variable is thus provided with an amplification factor which defines the strength of the effect thereof on the sum and accordingly on the first damping force. The relevant amplification factor may depend on further parameters aside from the frequency, for example the remaining spring travel or the damper presetting.

Preferably, the second amplification factor increases linearly with frequency. Also preferably, the third amplification factor increases quadratically with frequency. Advantageously, the progression of the acceleration over time is phase-shifted through 90° and the progression of the jerk over time is phase-shifted through 180° with respect to the progression of the speed over time.

The frequency range measured by the sensor device advantageously comprises at least one resonant frequency. Preferably, in a frequency interval extending from an initial frequency to the resonant frequency, the value of the acceleration summand and of the jerk summand increases, causing the first damping force of the damping element to increase. This advantageous increase is due to the fact that the second and third amplification factors increase linearly and quadratically with frequency. Preferably, in a frequency interval extending from the resonant frequency to an end frequency, the jerk summand is dominant, causing the first damping force of the damping element to decrease. The jerk summand is dominant as a result of the quadratic frequency dependency of the third amplification factor. Because of the antiphase behaviour of the speed and the jerk, the first damping force of the damping element decreases. Thus, high objective and subjective travel comfort are made possible for both low-frequency and high-frequency excitations. Thus, advantageously, by setting the appropriate amplification parameters, the influence of each summand on the sum and thus on the strength of the first damping force can be defined. The force of the damper, which is significantly increased by the effect of individual summands, can greatly reduce the undesirable increase in the vibration amplitudes in the range of the resonant frequency.

Since with air suspension the position of the resonant frequency of the seat suspension is almost invariable with change in the load on the seat surface, the amplification factors set for each summand can remain constant for all operating conditions. However, if a different type of spring is used in the system, the factors may be adapted in accordance with the load on the seat surface.

In a further aspect of the invention, a second damping force of the damping element can be adjusted by the adjustment device, it being possible for this second damping force to be determined by the adjustment device by way of a total damping travel of the damping element, a basic damping force presettable by way of a damping setting device, a position, measurable by the sensor device, of the seat-part-side upper part relative to the body-side lower part, and a movement direction of the seat-part-side upper part relative to the body-side lower part, it being possible for the movement direction to be determined from at least two temporally successive positions, measurable by the sensor device, of the seat-part-side upper part relative to the body-side lower part. The damper behaviour of the damping system can thus preferably be adjusted/controlled within the available damping travel as a function of the user-specific basic damping force, the position, and the movement of the seat-part-side upper part. The second damping force is thus adjustable independently of the magnitude of the speed, but depending on the movement direction and the current position of the seat-part-side upper part relative to the body-side lower part. Determining the second damping force has the advantage that a certain damping force can be set even at low spring retraction and excursion speeds.

Preferably, a maximum displacement of the position of the seat-part-side upper part relative to the body-side lower part is given by the total damping travel of the damping element, which is delimited by an upper and a lower damping travel end. Preferably, a vertical position, forming the target value for the adjustment, of the seat-part-side upper part relative to the body-side lower part can be adjusted by way of a height setting device. Ideally, a maximum settable vertical position is in a range of the total damping travel which preferably extends between a total damping travel centre and the upper damping travel end. Moreover, it is advantageous if a minimum settable vertical position is in a range of the total damping travel which extends between a total damping travel centre and the lower damping travel end. Thus, the pre-adjusted vertical position of the target value of the adjustment and the current position of the seat-part-side upper part relative to the body-side lower part is the current value of the adjustment. In the following, upwards means a direction towards the seat-part-side upper part and downwards means towards the body-side lower part. The second damping force adjusted by the adjustment device can preferably be determined by way of a pre-adjusted, user-specific basic damping force, a remaining damping travel, which can be determined by way of the total damping travel and the current position of the seat-part-side upper part, a pre-adjusted vertical position, and the movement direction of the seat-part-side upper part. For example, a vertically suspended seat has a total damping travel of 180 mm. The range of the total damping travel which is used for the vertical adjustment and which delimits the maximum and minimum settable vertical positions is for example 80 mm. Thus, a favourable available spring travel of 90 mm in both directions or +/− 50 mm and −/+ 130 mm in unfavourable situations comes about.

In a preferred embodiment, during displacement of the position of the seat-part-side upper part starting from the vertical position the second damping force, adjustable by the adjustment device, of the damping element is smaller within a comfort range of the total damping travel than outside the comfort range. This comfort range is delimited by an upper and a lower comfort limit. Ideally, the comfort range is a sub-range of the range of the total damping travel delimited by the maximum settable vertical position and the minimum settable vertical position. Preferably, the second damping force is constant within the comfort range. It would also be conceivable for the second damping force to be increasing or decreasing with the distance between the position of the seat-part-side upper part and the vertical position. Advantageously, the comfort range can be adapted in accordance with individual preferences or to the kinematics of the seat by parameterisation, in such a way that a comfortable soft central range can be sensed subjectively. It is advantageous if, during displacement of the position of the seat-part-side upper part starting from the maximum or minimum vertical position, the comfort range is limited to the maximum or the minimum vertical position.

In a further preferred embodiment, during displacement of the position of the seat-part-side upper part, starting from the vertical position, the second damping force, adjustable by the adjustment device, of the damping element grows linearly, outside the comfort range of the total damping travel, with the distance between the position of the seat-part-side upper part and the vertical position. However, growth in accordance with a different polynomial function would also be conceivable.

In a further particularly preferred embodiment, during displacement of the position of the seat-part-side upper part, in the direction of the vertical position, a damping force of the damping element which merely corresponds to the pre-adjusted basic damping force can be set by the adjustment device. Thus, during a return movement of the seat-part-side upper part, it is possible to reset to the position-independent, preselected basic damping force, causing the springback to be perceived as gentler. At the same time, a person on the seat subjectively has the feeling of being protected as a result of an increase in damping towards the end of the damping travel. Further, this type of adjustment stabilises the vertical position of the seat, since the seat springs back more softly towards the initial position.

In a further preferred embodiment, a third damping force of the damping element can be adjusted by the adjustment device. Preferably, this third damping force can be determined by way of the total damping travel, the presettable basic damping force, the position of the seat-part-side upper part relative to the body-side lower part, the movement direction, the magnitude of the speed, and a remaining damping travel of the seat-part-side upper part relative to the body-side lower part. Ideally, the remaining damping travel can be determined from the total damping travel and the position of the seat-part-side upper part relative to the body-side lower part. Preferably, the speed can be determined from at least two temporally successive positions of the seat-part-side upper part relative to the body-side lower part.

Preferably, the frequency range measured by the sensor device comprises at least one resonant frequency. Preferably, in a frequency interval extending from an initial frequency to the end frequency and containing the resonant frequency, the total damping force of the damping element corresponds to the first damping force. Advantageously, outside this frequency interval, the total damping force of the damping element is given by the sum of the second and third damping forces. Thus, in the frequency interval around the resonant frequency, an increased damping force can be provided, causing an increase in the vibration amplitude to be suppressed. Outside the frequency interval, to prevent/avoid end impacts, the instantaneous speed of the seat-part-side upper part can be compared with the remaining damping travel and optionally an additional third damping force can be superposed on the second damping force. Determining the second damping force has the advantage that some damping force is set even at low spring retraction and excursion speeds. Superposing the second and the third damping force has the advantage that the progressive transition to hard damping towards the damping travel end or else at higher speeds is less strongly and thus more pleasantly perceptible. The transition into the end-position or speed-dependent damping can thus be made more homogeneous (favourably for the insulating effect). Conversely, for a harder damper selection, if a sudden impact occurs, the damping can also be switched to be soft so as to pass on as little energy as possible to the seat-part-side upper part if sufficient spring travel is present. Superposition of the second damping force in the negative direction is thus also possible.

Preferably, during displacement of the position of the seat-part-side upper part relative to the body-side lower part, starting from the maximum vertical position and in the direction of the upper damping travel end, or during displacement of the position of the seat-part-side upper part relative to the body-side lower part, starting from the minimum vertical position and in the direction of the lower damping travel end, a damping force of the damping element which is increased by an end impact protection factor can be set by the adjustment device. Ideally, during displacement of the position of the seat-part-side upper part in the opposite direction, a damping force of the damping element without an end impact protection factor can be set by the adjustment device. Thus, an end impact of the seat-part-side upper part can be effectively suppressed, resulting in increased seat comfort. Preferably, during displacement in the opposite direction, the end impact protection factor is not effective. As a result of a measure of this type, the seat-part-side upper part can be returned into the target position as rapidly as possible, resulting in further improvement of the seat comfort.

In a further preferred embodiment, the adjustable damping system comprises an acceleration sensor. Excitations are transmitted from the body-side lower part to the seat-part-side upper part. Thus, it is preferred for the acceleration sensor to be arranged on the body-side lower part. Advantageous use of acceleration values by the adjustment device in this manner makes it possible to determine the necessary speeds, to be determined for the adjustment, more effectively in terms of time, meaning that a more rapid reaction of the damping system to suddenly occurring deflections of the seat-part-side upper part relative to the body-side lower part can be achieved. Further, the acceleration sensor makes it possible to identify driver movement, in other words it is possible to distinguish whether a movement of the upper part is a result of driver movement and/or of excitation due to vibrations of the lower part.

The object is further achieved by a vehicle seat comprising an adjustable damping system according to any of the preceding embodiments.

The object is likewise achieved by a method for adjusting an adjustable damping system for a vehicle seat for damping vibrations of a seat-part-side upper part relative to a body-side lower part in at least one spatial direction (X, Y, Z), at least one damping element, arranged between the seat-part-side upper part and the body-side lower part and adjustable by an adjustment device, being provided for the damping, the method comprising the following steps:

determining at least one relative movement variable and changing the relative movement variable of the seat-part-side upper part relative to the body-side lower part by way of a sensor device;

adjusting a first damping force of the damping element by way of the adjustment device, the first damping force being determined by the adjustment device as a function of the at least one relative movement variable and the frequency of the change in the relative movement variable.

Preferably, the first damping force of the damping element is adjusted by the adjustment device as a function of a speed, an acceleration and the jerk of the seat-part-side upper part relative to the body-side lower part. Jerk is defined as the derivative of acceleration with respect to time, in other words the second derivative of speed with respect to time and the third derivative of the positional vector with respect to time.

Preferably, the first damping force, adjusted by the adjustment device, of the damping element is proportional to the sum of a speed summand, an acceleration summand and a jerk summand.

Preferably, the speed summand is the product of a first frequency-dependent amplification factor and the value of the speed. Also preferably, the acceleration summand is the product of a second frequency-dependent amplification factor and the value of the acceleration and the jerk summand is the product of a third frequency-dependent amplification factor and the value of the jerk. Jerk is defined as the derivative of acceleration with respect to time, in other words the second derivative of speed with respect to time and the third derivative of the positional vector with respect to time. The relevant amplification factor may depend on further parameters aside from the frequency, for example the remaining spring travel or the damper presetting.

In a preferred embodiment, the frequency range measured by the sensor device comprises at least one resonant frequency.

Preferably, in a frequency interval extending from an initial frequency to the resonant frequency, the values of the acceleration summand and the jerk summand increase, causing an increasing first damping force of the damping element to be set. Advantageously, in a frequency interval extending from the resonant frequency to an end frequency, the jerk summand is dominant, causing a decreasing first damping force of the damping element to be set.

In a further preferred embodiment, the adjustment device adjusts a second damping force of the damping element. This second damping force is determined by the adjustment device by way of a total damping travel of the damping element, a basic damping force presettable using a damping setting device, a position, measurable by the sensor device, of the seat-part-side upper part relative to the body-side lower part, and a movement direction of the seat-part-side upper part relative to the body-side lower part. The movement direction is determined from at least two temporally successive positions, measured by the sensor device, of the seat-part-side upper part relative to the body-side lower part.

Preferably, a maximum displacement of the position of the seat-part-side upper part relative to the body-side lower part is given by the total damping travel of the damping element, which is delimited by an upper and a lower damping travel end. Preferably, a vertical position, forming the target value for the adjustment, of the seat-part-side upper part relative to the body-side lower part can be adjusted by way of a height setting device. Ideally, a maximum settable vertical position is in a range of the total damping travel which preferably extends between a total damping travel centre and the upper damping travel end. Moreover, it is advantageous if a minimum settable vertical position is in a range of the total damping travel which extends between a total damping travel centre and the lower damping travel end.

In a preferred embodiment, during displacement of the position of the seat-part-side upper part, starting from the vertical position, the second damping force, adjusted by the adjustment device, of the damping element is smaller within a comfort range of the total damping travel than outside the comfort range. This comfort range is delimited by an upper and a lower comfort limit. Ideally, the comfort range is a sub-range of the range of the total damping travel delimited by the maximum settable vertical position and the minimum settable vertical position. Preferably, the first damping force is constant within the comfort range. It would also be conceivable for the second damping force to be increasing or decreasing with the distance between the position of the seat-part-side upper part and the vertical position. Advantageously, the comfort range can be adapted in accordance with individual preferences or to the kinematics of the seat by parameterisation, in such a way that a comfortable soft central range can be sensed subjectively. It is advantageous if, during displacement of the position of the seat-part-side upper part starting from the maximum or minimum vertical position, the comfort range is limited to the maximum or the minimum vertical position.

In a further preferred embodiment, during displacement of the position of the seat-part-side upper part, starting from the vertical position, the second damping force, adjusted by the adjustment device, of the damping element grows linearly, outside the comfort range of the total damping travel, with the distance between the position of the seat-part-side upper part and the vertical position.

In a further particularly preferred embodiment, during displacement of the position of the seat-part-side upper part, in the direction of the vertical position, the adjustment device sets a damping force of the damping element which merely corresponds to the pre-adjusted basic damping force.

In a further preferred embodiment, a third damping force of the damping element is adjusted by the adjustment device. Preferably, this third damping force is determined by way of the total damping travel, the presettable basic damping force, the position of the seat-part-side upper part relative to the body-side lower part, the movement direction, the magnitude of the speed, and a remaining damping travel of the seat-part-side upper part relative to the body-side lower part. Ideally, the remaining damping travel is determined from the total damping travel and the position of the seat-part-side upper part relative to the body-side lower part. Preferably, the speed is determined from at least two temporally successive positions of the seat-part-side upper part relative to the body-side lower part.

Preferably, the frequency range measured by the sensor device comprises at least one resonant frequency. Preferably, in a frequency interval extending from an initial frequency to the end frequency and containing the resonant frequency, the total damping travel, adjusted by the adjustment device, of the damping element corresponds to the first damping force. Advantageously, outside this frequency interval, the total damping force, adjusted by the adjustment device, of the damping element is given by the sum of the second and the third damping force.

Preferably, during displacement of the position of the seat-part-side upper part, starting from the maximum vertical position and in the direction of the upper damping travel end, or during displacement of the position of the seat-part-side upper part, starting from the minimum vertical position and in the direction of the lower damping travel end, a damping force of the damping element which is increased by an end impact protection factor is set by the adjustment device. Ideally, during displacement of the position in the opposite direction, a damping force of the damping element without an end impact protection factor is set.

Further advantages, aims and properties of the present invention are described in the following description of the accompanying drawings. Similar components may have similar reference numerals in the different embodiments.

BRIEF DESCRIPTION OF THE DRAWINGS

In the drawings:

FIG. 3a, b, c are each a graph of the second damping force as a function of the position of the seat-part-side upper part relative to the body-side lower part;

DETAILED DESCRIPTION

Figure 1:
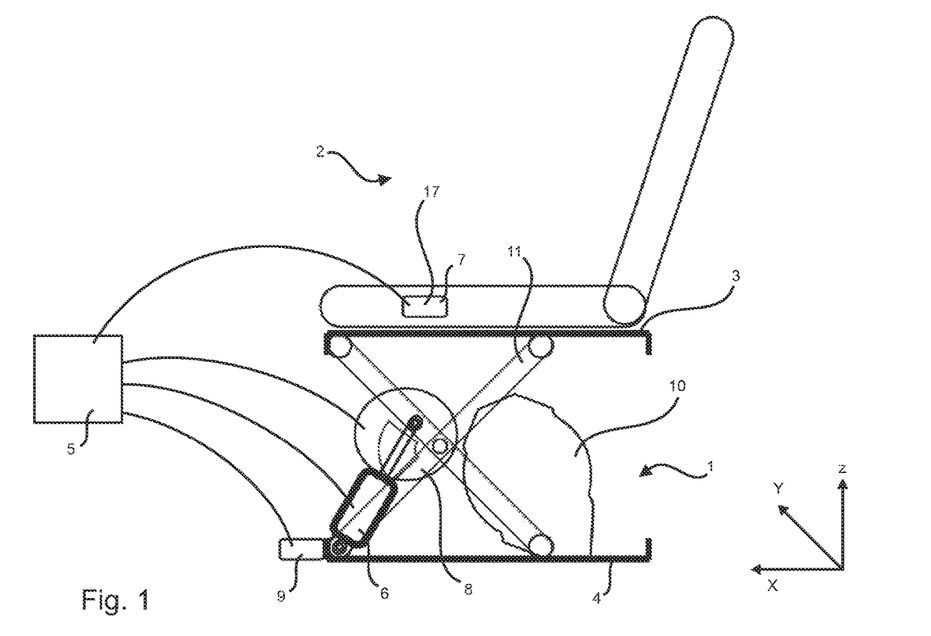
FIG. 1 is a side view of a vehicle seat comprising a damping system.

FIG. 1 shows a vehicle seat (2) comprising an adjustable damping system (1) for damping vibrations of a seat-part-side upper part (3) relative to a body-side lower part (4) in at least one spatial direction (X, Y, Z) in accordance with one possible embodiment. The damping system comprises at least one damping element (6), arranged between the seat-part-side upper part (3) and the body-side lower part (4) and adjustable by an adjustment device (5).

A scissor frame (11) and a spring element (10) are further arranged between the seat-part-side upper part (3) and the body-side lower part (4). In this embodiment, the spring element (10) is configured as a pneumatic spring element. The damping element (6) is arranged between a lower articulation point of the first scissor arm and the second scissor arm. An acceleration sensor (9) may optionally also be arranged at the lower articulation point. The acceleration of the seat-part-side upper part (3) relative to a body-side lower part (4) can thus be determined from the angular acceleration of the rotation at the articulation point.

The damping system (1) further comprises a damping setting device (7), by means of which a basic damping force can be specifically pre-adjusted by the user of the seat. The current position of the seat-part-side upper part (3) relative to the body-side lower part (4) can be measured by a sensor device (8). In this embodiment, the sensor device (8) is configured as a rotating height sensor. Displacement of the seat-part-side upper part (3) relative to the body-side lower part (4) brings about rotation in the height sensor, it being possible to determine the displacement distance and thus the position of the seat-part-side upper part (3) relative to the body-side lower part (4) from the angle of rotation. The sensor device (8), the damping setting device (7) and the damping element are connected to an adjustment device (5). If the adjustment is based on acceleration data of the seat-part-side upper part (3), naturally the acceleration sensor (9) is also connected to the adjustment device (5).

The damping system (1) further comprises a height setting device (17), by means of which a vertical position of the seat-part-side upper part (3) relative to the body-side lower part (4) is adjustable. The height setting device (17) may for example further comprise an adjustable pump which is connected to the pneumatic spring element (10). The height adjustment would thus be implemented by the supply and removal of air into or out of the pneumatic spring element (10). Alternatively, additional actuators would also be conceivable.

Figure 2:
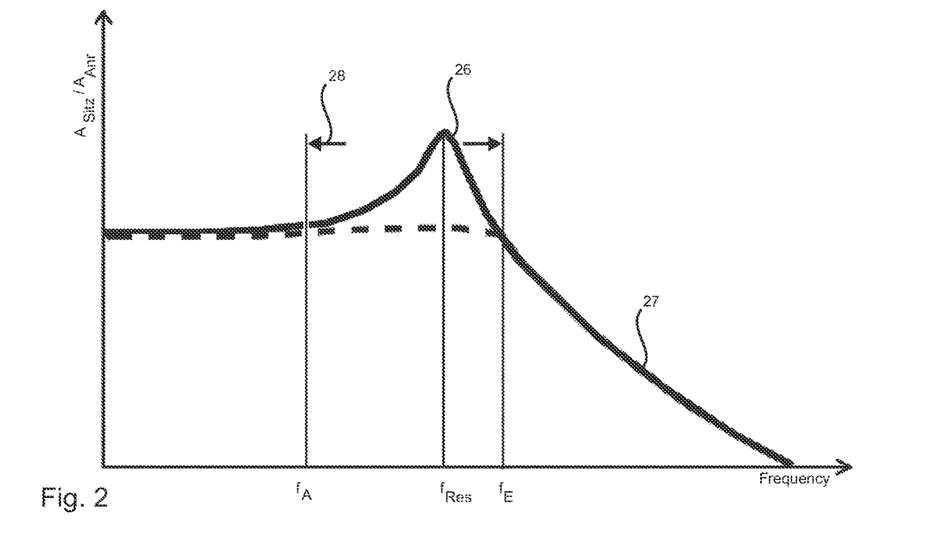
FIG. 2 shows the ratio between the vibration amplitude of the seat and the amplitude of the excitation as a function of frequency.

FIG. 2 shows the ratio of the vibration amplitude ($A_{Sitz}$) of the seat to the amplitude ($A_{Anr}$) of the excitation as a function of frequency. The graph (26) shows a typical progression of the ratio of the vibration amplitude in conventional seat damping systems as a function of frequency. In a frequency interval (28) extending from an initial frequency ($f_A$) to an end frequency ($f_E$) and containing the resonant frequency ($f_{Res}$), an increase in the vibration amplitude is detectable in the range between the initial frequency ($f_A$) and the resonant frequency ($f_{Res}$). In the range between the resonant frequency ($f_{Res}$) and the end frequency ($f_E$), the vibration amplitude decreases again. A decrease in the introduced vibrations occurs above the end frequency ($f_E$), which is typically $\sqrt{2}$ times the natural frequency of the vibration system, and increases with increasing excitation frequency. This effect is also known as vibration isolation.

The adjustable damping system (1) according to the invention for a vehicle seat (2) for damping vibrations of a seat-part-side upper part (3) relative to a body-side lower part (4) in at least one spatial direction (X, Y, Z) is provided for damping at least one damping element (6), arranged between the seat-part-side upper part (3) and the body-side lower part (4) and adjustable by an adjustment device (5). This adjustable damping system (1) is further distinguished in that at least one relative movement variable and a change in the relative movement variable of the seat-part-side upper part (3) relative to the body-side lower part (4) can be determined by a sensor device (8), and a first damping force (25) of the damping element (6) can be adjusted by the adjustment device (5) as a function of the at least one relative movement variable and the frequency of the change in the relative movement variable.

The first damping force (25) of the damping element (6) by the adjustment device (5) can be adjusted by the adjustment device (5) as a function of a speed (V), an acceleration (B) and a jerk (R) of the seat-part-side upper part (3) relative to the body-side lower part (4). The first damping force (25), adjustable by the adjustment device (5), of the damping element (6) is proportional to the sum of a speed summand, an acceleration summand and a jerk summand, the speed summand being the product of a first frequency-dependent amplification factor ($K_1(f)$) and the value of the speed (V), the acceleration summand being the product of a second frequency-dependent amplification factor ($K_2(F)$) and the value of the acceleration (B), and the jerk summand being the product of a third frequency-dependent amplification factor ($K_3(f)$) and the value of the jerk (R).

The graph (27) shows the progression of the ratio of the vibration amplitude in the adjustable damping system according to the invention. In the frequency interval (28) extending from an initial frequency ($f_A$) to an end frequency ($f_E$) and containing the resonant frequency ($f_{Res}$), no increase in the vibration amplitude can be detected. Thus, high objective and subjective travel comfort are made possible.

Figures 3A, 3B:
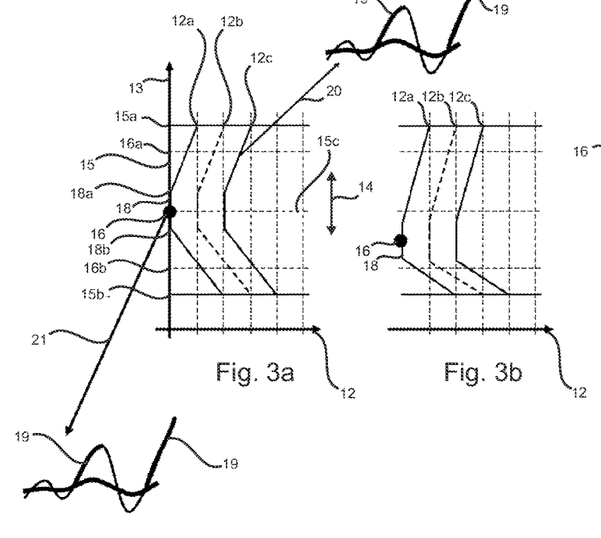
Figure 3C:
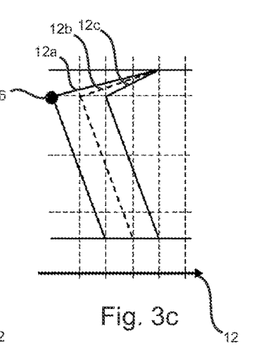

FIGS. 3a, 3b and 3c are each a graph of the second damping force (12) as a function of the position (13) of the seat-part-side upper part (3) relative to the body-side lower part (4). The x-axis gives the second damping force (12), and the y-axis gives the position (13) of the seat-part-side upper part (3) relative to the body-side lower part (4). The second damping force (12) of the damping element (6) is adjusted by the adjustment device (5) by way of a basic damping force, which is adjustable by the damping setting device (7), and the position (13), measurable by the sensor device (8), of the seat-part-side upper part (3) relative to the body-side lower part (4) and the movement direction (14) of the seat-part-side upper part (3) relative to the body-side lower part (4). The movement direction (14) is determined from at least two temporally successive positions (13), measurable by a sensor device (8), of the seat-part-side upper part (3) relative to the body-side lower part (4).

The graphs (12a, 12b, 12c) represent the progression of the second damping force (12) with a differently pre-adjusted basic damping force. A maximum displacement of the position (13) of the seat-part-side upper part (3) relative to the body-side lower part (4) is given by a maximum damping travel (15) of the damping element (6). The maximum damping travel (15) is delimited by an upper (15a) and a lower damping travel end (15b). The vertical position (16), adjustable by the height setting device (17), of the seat-part-side upper part (3) relative to the body-side lower part (4) forms the target value for the adjustment. A maximum settable vertical position (16a) is in a range of the total damping travel (15) extending between a total damping travel centre (15c) and the upper damping travel end (15a), and a minimum settable vertical position (16b) is in a range of the total damping travel (15) extending between a total damping travel centre (15c) and the lower damping travel end (15a).

In FIG. 3a, the vertical position (16) is pre-adjusted in the damping travel centre (15c). During displacement of the position (13) in the direction of the lower damping travel end (15b), the damping force (12) increases more than during displacement in the direction of the upper damping travel end (15a). This results in increased seat comfort, since an impact during a downward movement is subjectively perceived as more unpleasant than an upper end impact.

In FIG. 3b, the vertical position (16) is pre-adjusted between the total damping travel centre (15c) and the lower damping travel end (15b). Presetting of this type has a greater increase in the second damping force (12) during displacement of the position (13) in the direction of the lower damping travel end (15b), since less damping travel is available.

In FIG. 3c, the pre-adjusted vertical position (16) corresponds to the maximum vertical position (16a). In this case, less damping travel is available in the direction of the upper damping travel end (15a). Accordingly, the second damping force (12) has a greater increase during upward displacement of the position (13) in the direction of the upper damping travel end (15a).

The increase in the second damping force (12) for a movement direction of the seat-part-side upper part (3) relative to the body-side lower part (4) can advantageously be defined freely by selecting appropriate parameters. For example, it would also be conceivable to adjust higher damping during spring excursion. Higher damping of this type during spring excursion facilitates actuation of the pedals of the motor vehicle by a driver located on the seat.

Depending on the position (13) of the seat-part-side upper part (3) relative to the body-side lower part (4), the second damping force (12) of the damping element (6) has a comfort range (18) delimited by an upper (18a) and a lower comfort limit (18b). In this comfort range (18), the damping force (12) is constant for displacement of the position (13) of the seat-part-side upper part (3) relative to the body-side lower part (4). This can be seen in FIGS. 3a and 3b. In FIG. 3c, the pre-adjusted vertical position (16) corresponds to the maximum presettable vertical position (16a). In this case, the upper (18a) and the lower comfort limit (18b) are equal to the vertical position (16).

A third damping force (19) of the damping element (6) is adjustable by way of the adjustment device (5). This third damping force (19) can be determined by way of the total damping travel (15), the presettable basic damping force, the position (13) of the seat-part-side upper part (3) relative to the body-side lower part (4), the movement direction (14), the magnitude of the speed, and a remaining damping travel of the seat-part-side upper part (3) relative to the body-side lower part (4). The remaining damping travel can be determined from the maximum damping travel (15) and the position (13) of the seat-part-side upper part (3) relative to the body-side lower part (4), and the speed can be determined from at least two temporally successive positions (13) of the seat-part-side upper part (3) relative to the body-side lower part (4).

In a frequency range outside the frequency interval (28) extending from an initial frequency ($f_A$) to an end frequency ($f_E$) and containing the resonant frequency ($f_{Res}$), the total damping force of the damping element (5) is given by the sum of the second (12) and third damping forces (19). The third damping force (19) may be superposed on the second damping force (12) in the same direction. This is required for example if only a little remaining damping travel is available (position (20) in FIG. 3a). An end impact can thus effectively be avoided. If a sudden impact occurs, the third damping force (19) can be directed counter to the second damping force (12), in such a way that the total damping force is set to be gentler. This is only expedient if there is sufficient remaining damping travel (position (21)). Thus, the seat-part-side upper part is deflected as little as possible.

Figures 4, 5:
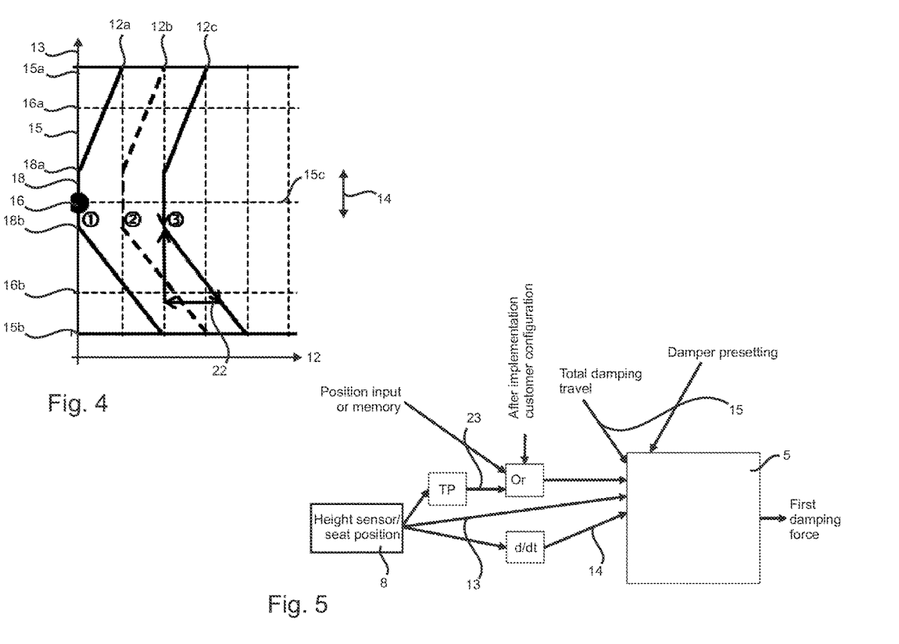
FIG. 4 is a graph of the second damping force as a function of the position of the seat-part-side upper part relative to the body-side lower part in accordance with a further embodiment.
FIG. 5 is an algorithm structure for determining the second damping force.

FIG. 4 is a graph analogous to FIG. 3a. Further, the graph shows an alternative return displacement travel (22) of the position (13) of the seat-part-side upper part (3). For this return displacement travel (22), only the position-independent, pre-adjusted basic damping force is effective. An embodiment of this type results in gentler and/or more rapid retraction of the seat-part-side upper part (3). At the same time, the seat-part-side upper part (3) is stabilised in height, since it springs back into the initial position more gently.

FIG. 5 shows an algorithm structure for the adjustment device (5) to determine the second damping force (12) of the damping element (6). The position (13) of the seat-part-side upper part (3) relative to the body-side lower part (4) is measured by the sensor device (8) and supplied to the adjustment device (5). Further, an average position is detected by a low-pass or mean value formation filter (TP) and passed to the adjustment device (5). This value forms the target value for the adjustment. Likewise, a position specification could be provided from a memory or otherwise. Likewise, the movement direction (14) of the position (13) is supplied to the adjustment device (5). Further, the second damping force (12) is determined by way of a basic damping force (12), which can be pre-adjusted by a damping setting device (7), and the total damping travel (15). The first damping force is calculated by means of a characteristic or a look-up table.

Figure 6:
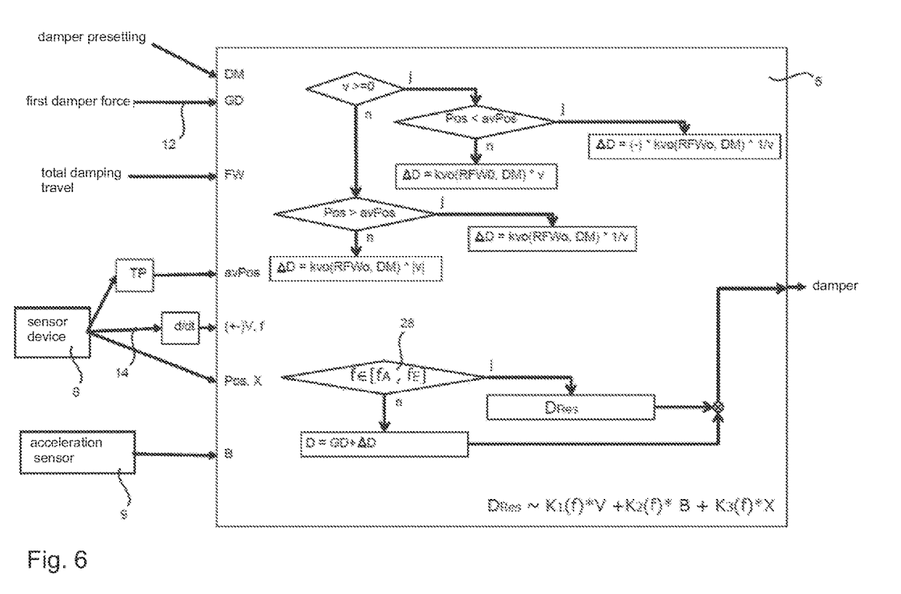
FIG. 6 is an algorithm structure for determining the total damping force.

FIG. 6 shows an algorithm structure for the adjustment device (5) to determine the total damping force D of the damping element (6). The following parameters are supplied to the adjustment device (5): the position (13) of the seat-part-side upper part (3) relative to the body-side lower part (4) as measured by the sensor device (8), a basic damping force (DM) presettable by the damping setting device (7), an average position (avPos) determined by a low-pass or mean value formation filter (TP), the total damping travel (FW), the second damping force (12, GD), the movement direction (14), and the speed (V) of the seat-part-side upper part (3) relative to the body-side lower part (4). Further, the parameter of the frequency (f) of the speed changes is supplied to the algorithm. The measured time-dependent values can for example be converted into a frequency spectrum by way of a Fourier transformation. Further, the values (B) from an acceleration sensor (9) may also be included.

The third damping force (19, $\Delta D$) is formed from a first parameter (kvo), which is a function of the remaining damping travel (RFWo) and the presettable basic damping force (DM), and a speed factor $V^n$ (n=+/−1). If V≥0, for a current position (13, Pos) greater than the average position (avPos) the first parameter (kvo) is multiplied by the magnitude (|V|) of the speed. Otherwise, the first parameter (kvo) is multiplied by the reciprocal (1/V) of the speed. If V<0, for a current position (13, Pos) greater than the average position (avPos) the first parameter (kvo) is multiplied by the reciprocal (1/V) of the speed and otherwise it is multiplied by the magnitude (|V|) of the speed.

For frequencies (f) outside the frequency interval (28) extending from an initial frequency ($f_A$) to an end frequency ($f_E$) and containing the resonant frequency, the total damping force (D) is taken as the sum of the second damping force (12, GD) and the third damping force (19, $\Delta D$).

For frequencies (f) within the frequency interval (28), the first damping force (25, $D_{Res}$) is adjusted at the damping element. The first damping force (25, $D_{Res}$) is proportional to the sum of a speed summand, an acceleration summand and a jerk summand, the speed summand being the product of a first frequency-dependent amplification factor ($K_1(f)$) and the value of the speed (V), the acceleration summand being the product of a second frequency-dependent amplification factor ($K_2(f)$) and the value of the acceleration (B), and the jerk summand being the product of a third frequency-dependent amplification factor ($K_3(f)$) and the value of the jerk (R).

The second amplification factor ($K_2(f)$) increases linearly with frequency, and the third amplification factor ($K_3(f)$) increases quadratically with frequency. Further, the progression of the acceleration over time is phase-shifted through 90° and the progression of the jerk over time is phase-shifted through 180° with respect to the progression of the speed over time.

The frequency range measured by the sensor device (8) includes a resonant frequency. In the frequency interval (28) extending from an initial frequency ($f_A$) to the resonant frequency ($f_{Res}$), the values of the acceleration summand and distance summand increase, causing the first damping force (25, $D_{Res}$) to increase. This advantageous increase is because the second ($K_2(f)$) and third amplification factors ($K_3(f)$) increase linearly and quadratically with frequency. In the frequency range extending from the resonant frequency ($f_{Res}$) to an end frequency ($f_E$), the travel summand is dominant, causing the first damping force (25, $D_{Res}$) to decrease. The jerk summand is dominant as a result of the quadratic frequency dependency of the third amplification factor ($K_3(f)$). Because of the antiphase behaviour of the speed and the jerk, the first damping force of the damping element decreases. Thus, high objective and subjective travel comfort are made possible for both low-frequency and high-frequency excitations. Thus, advantageously, by setting the appropriate amplification parameters, the influence of each summand on the sum and thus on the strength of the first damping force (25, $D_{Res}$) can be defined. The force of the damper, which is significantly increased by the effect of individual summands, can greatly reduce the undesirable increase in the vibration amplitudes in the range of the resonant frequency.

Figure 7A:
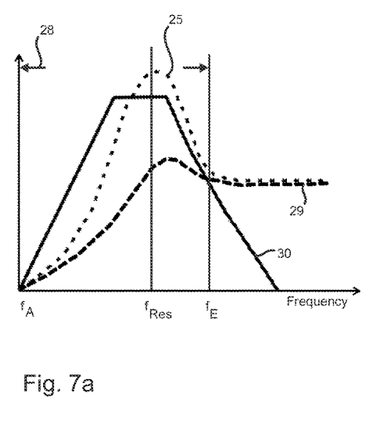
FIG. 7a, b are graphs of the first damping force as a function of frequency.
Figure 7B:
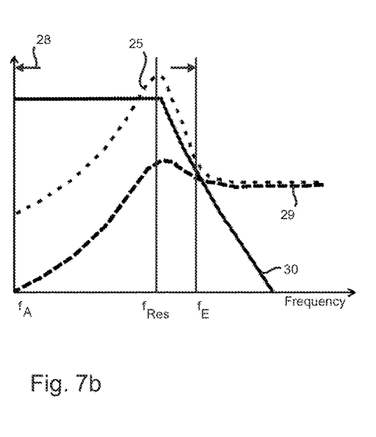

The above-described behaviour of the first damping force (25, $D_{Res}$) can be seen in FIG. 7a, 7b. The graphs show a progression (29) of a damping force of conventional seat damping systems and an actuation signal (30) for the damping element. In the graph of FIG. 7b, all of the aforementioned summands contribute to the damping force. The graph of FIG. 7b shows a progression of the first damping force (25, $D_{Res}$) for which the travel summand is not taken into account.

Figure 8:
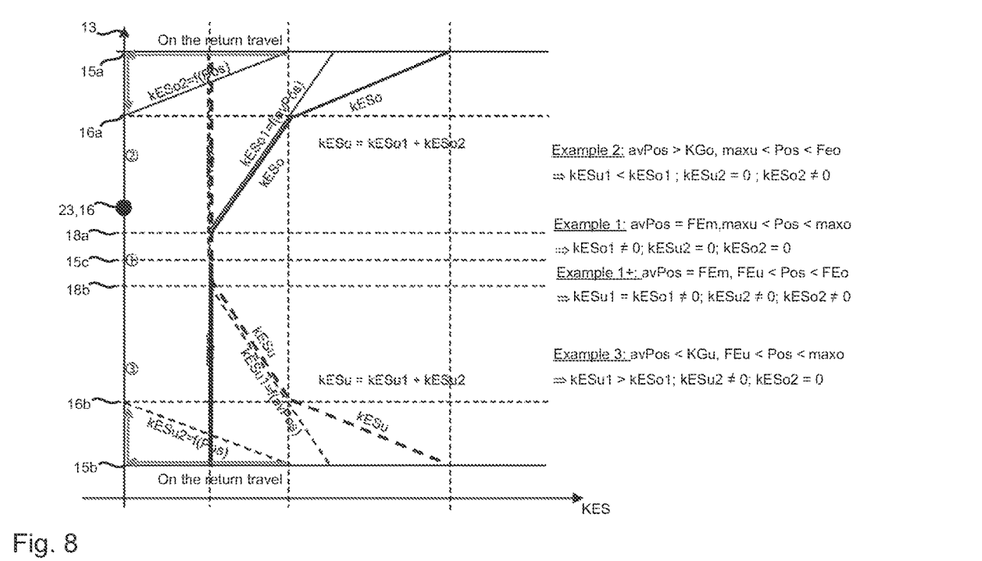
FIG. 8 is a graph of the third damping force as a function of the position of the seat-part-side upper part relative to the body-side lower part in accordance with a further embodiment.

FIG. 8 is a graph of the damping force as a function of the position of the seat-part-side upper part relative to the body-side lower part in accordance with a further embodiment. In the graph, the x-axis gives the third parameter kES and the y-axis gives the position (13) of the seat-part-side upper part (3) relative to the body-side lower part (4). In this embodiment, the damping force is given by $D=kES \cdot V^n$. The third parameter kES is a function of: the upper damping travel end (15a, FEo), the lower damping travel end (15b, FEu), the damping travel centre (15c, FEm), the maximum vertical position (16a, maxo), the minimum vertical position (16b, minu), the upper comfort limit (18a, KGo), the lower comfort limit (18b, KGu), the average position (23, avPos), the current position (13, Pos), the pre-adjusted basic damping force (DM) and the movement direction (14, sgn(V)). The exponent n is in the range of 0 to ∞. At n=0, D is independent of the magnitude of the speed, and corresponds to the first damping force. For 0<n<1, the damping system (1) has a degressive characteristic, and for n≥1 it has a progressive characteristic. For a fixed exponent n, the third parameter kES determines the characteristic of the damping force. For V≥0: kES=kESo, and for V<0: kES=kESu. The third parameter is composed of two constituents: kES=kES1+kES2 (kESo=kESo1+kESo2, kESu=kESu1+kESu2), where kES2 is only unequal to 0 for a position in a range between the maximum vertical position (16a, maxo) and the upper damping travel end (15a, FEo) and in a range between the minimum vertical position (16b, maxu) and the lower damping travel end (15b, FEu). If the current position (13, Pos) of the seat-part-side upper part (3) goes beyond the maximum vertical position (16a, maxo) or the minimum vertical position (16b, maxu), kES becomes higher as a result of the kES2 components. The damping force is thus increased by an end impact protection factor kES2, making it possible effectively to prevent an end impact of the seat-part-side upper part (3). To increase comfort, the seat-part-side upper part (3) should be returned into the average position (23) or to the target value for the adjustment as rapidly as possible. Accordingly, during the return movement the kES2 component is set to 0.

All features disclosed in the application documents are claimed as essential to the invention if they are novel over the prior art individually or in combination.

LIST OF REFERENCE SIGNS

1 Adjustable damping system
2 Vehicle seat
3 Seat-part-side upper part
4 Body-side lower part
5 Adjustment device
6 Damping element
7 Damping setting device
8 Sensor device
9 Acceleration sensor
10 Spring element
11 Scissor frame
12 Second damping force
12a Second damping force as a function of a first presettable basic damping force
12b Second damping force as a function of a second presettable basic damping force
12c Second damping force as a function of a third presettable basic damping force
13 Position of seat-part-side upper part
14 Movement direction
15 Maximum damping travel
15a Upper damping travel end
15b Lower damping travel end
15c Total damping travel centre
16 Vertical position
16a Maximum vertical position
16b Minimum vertical position
17 Height setting device
18 Comfort range
18a Upper comfort limit
18b Lower comfort limit
19 Third damping force
20 Position of seat-part-side upper part relative to body-side lower part
21 Position of seat-part-side upper part relative to body-side lower part
Return displacement travel
23 Average position
24a Example position 1
24b Example position 2
24c Example position 3
25 First damping force
26 Progression of the ratio of the vibration amplitudes in conventional seat damping systems
27 Progression of the ratio of the vibration amplitudes in seat damping system according to the invention
28 Frequency interval
29 Progression of a damping force of conventional seat damping systems
30 Actuation signal
avPos Average position of seat-part-side upper part relative to body-side lower part
$A_{Sitz}$ Seat vibration amplitude
$A_{Anr}$ Excitation vibration amplitude
avPos Average position of seat-part-side upper part relative to body-side lower part
B Acceleration
D Total damping force
$D_{Res}$ First damping force
ΔD Third damping force
DM Presettable basic damping force
f Frequency
$f_A$ Initial frequency
$f_{Res}$ Resonant frequency
$f_E$ End frequency
FW Total damping travel
FEo Upper damping travel end
FEu Lower damping travel end
FEm Damping travel centre
GD Second damping force
$K_1(f)$ First amplification factor
$K_2(f)$ Second amplification factor
$K_3(f)$ Third amplification factor
kvo First parameter
kRFr Second parameter
kES Third parameter
kES2 End impact protection factor
KGo Upper comfort limit
KGu Lower comfort limit
maxo Maximum vertical position
maxu Minimum vertical position
Pos Position of seat-part-side upper part relative to body-side lower part
R Jerk
RFWo Remaining damping travel
TP Low-pass or mean value formation filter
V Speed
X, Y, Z Spatial directions

The invention claimed is:

1. An adjustable damping system for a vehicle seat for damping vibrations of a seat-part-side upper part relative to a body-side lower part in at least one spatial direction (X, Y, Z), at least one damping element, arranged between the seat-part-side upper part and the body-side lower part and adjustable by an adjustment device, being provided for the damping,
wherein at least one relative movement variable and a change in the relative movement variable of the seat-part-side upper part relative to the body-side lower part can be determined by a sensor device, and a first damping force of the damping element can be adjusted by the adjustment device as a function of the at least one relative movement variable and a frequency of the change in the relative movement variable.

2. The adjustable damping system according to claim 1, wherein the first damping force of the damping element is adjustable by the adjustment device as a function of a speed (V), an acceleration (B) and a jerk (R) of the seat-part-side upper part relative to the body-side lower part.

3. The adjustable damping system according to claim 2, wherein the first damping force, adjustable by the adjustment device, of the damping element is proportional to a sum of a speed summand, an acceleration summand and a jerk summand, the speed summand being the product of a first frequency-dependent amplification factor ($K_1(f)$) and the value of the speed (V), the acceleration summand being the product of a second frequency-dependent amplification factor ($K_2(f)$) and the value of the acceleration (B), and the jerk summand being the product of a third frequency-dependent amplification factor ($K_3(f)$) and the value of the displacement travel (X).

4. The adjustable damping system according to claim 3, wherein a frequency range measured by the sensor device comprises at least one resonant frequency ($f_{Res}$), in a frequency interval extending from an initial frequency ($f_A$) to the resonant frequency ($f_{Res}$) the value of the acceleration summand and of the jerk summand increasing, causing the first damping force of the damping element to increase, in a frequency interval extending from the resonant frequency ($f_{Res}$) to an end frequency ($f_E$) the jerk summand being dominant, causing the first damping force of the damping element to decrease.

5. The adjustable damping system according to claim 1, wherein a second damping force of the damping element can be adjusted by the adjustment device, wherein this second damping force is determined by the adjustment device by way of a total damping travel of the damping element, a basic damping force presettable by way of a damping setting device, a position, measurable by a sensor device, of the seat-part-side upper part relative to the body-side lower part, and a movement direction of the seat-part-side upper part relative to the body-side lower part, wherein the movement direction is determined from at least two temporally successive positions, measurable by the sensor device, of the seat-part-side upper part relative to the body-side lower part.

6. The adjustable damping system according to claim 5, wherein a maximum displacement of the position of the seat-part-side upper part relative to the body-side lower part is given by the total damping travel of the damping element, which is delimited by an upper and a lower damping travel end, and a vertical position, forming a target value for the adjustment, of the seat-part-side upper part relative to the body-side lower part can be adjusted by way of a height setting device, a maximum settable vertical position being in a range of the total damping travel which preferably extends between a total damping travel centre and the upper damping travel end, and a minimum settable vertical position being in a range of the total damping travel which extends between a total damping travel centre and the lower damping travel end.

7. The adjustable damping system according to claim 6, wherein during displacement of the position of the seat-part-side upper part, starting from the vertical position, the second damping force, adjustable by the adjustment device, of the damping element is smaller within a comfort range of the total damping travel than outside the comfort range, the comfort range being delimited by an upper and a lower comfort limit, the comfort range being a sub-range of the range of the total damping travel delimited by the maximum settable vertical position and the minimum settable vertical position, the second damping force being constant within the comfort range or increasing or decreasing with the distance between the position of the seat-part-side upper part and the vertical position, during displacement of the position of the seat-part-side upper part, starting from the maximum or minimum vertical position, the comfort range is limited to the maximum or the minimum vertical position.

8. The adjustable damping system according to claim 6, wherein during displacement of the position of the seat-part-side upper part, starting from the vertical position, the second damping force, adjustable by the adjustment device, of the damping element grows linearly, outside the comfort range of the total damping travel, with the distance between the position of the seat-part-side upper part and the vertical position.

9. The adjustable damping system according to claim 6, wherein during displacement of the position of the seat-part-side upper part, in the direction of the vertical position, a damping force of the damping element which merely corresponds to the pre-adjusted basic damping force can be set by the adjustment device.

10. The adjustable damping system according to claim 6, wherein a third damping force of the damping element can be adjusted by the adjustment device, wherein this third damping force is determined by way of the total damping travel, the presettable basic damping force, the position of the seat-part-side upper part relative to the body-side lower part, the movement direction, the magnitude of the speed, and a remaining damping travel of the seat-part-side upper part relative to the body-side lower part, wherein the remaining damping travel is determined from the total damping travel and the position of the seat-part-side upper part relative to the body-side lower part, wherein the speed is determined from at least two temporally successive positions of the seat-part-side upper part relative to the body-side lower part.

11. The adjustable damping system according to claim 10, wherein a frequency range measured by the sensor device comprises at least one resonant frequency, in a frequency interval extending from an initial frequency to an end frequency and containing the resonant frequency, the total damping force of the damping element corresponding to the first damping force, and outside this frequency interval the total damping force of the damping element being given by the sum of the second and third damping forces.

12. The adjustable damping system according to claim 6, wherein during displacement of the position of the seat-part-side upper part, starting from the maximum vertical position and in the direction of the upper damping travel end, or during displacement of the position of the seat-part-side upper part, starting from the minimum vertical position and in the direction of the lower damping travel end, a damping force of the damping element which is increased by an end impact protection factor can be set by the adjustment device, during displacement of the position of the seat-part-side upper part in the opposite direction, wherein a damping force of the damping element is set without an end impact protection factor by the adjustment device.

13. A vehicle seat comprising an adjustable damping system according to claim 1.

* * * * *